W. R. SELDON.
PETCOCK OPENER AND CLOSER FOR AUTOMOBILE CRANK CASES.
APPLICATION FILED OCT. 22, 1915.
1,184,883.
Patented May 30, 1916.
2 SHEETS—SHEET 1.
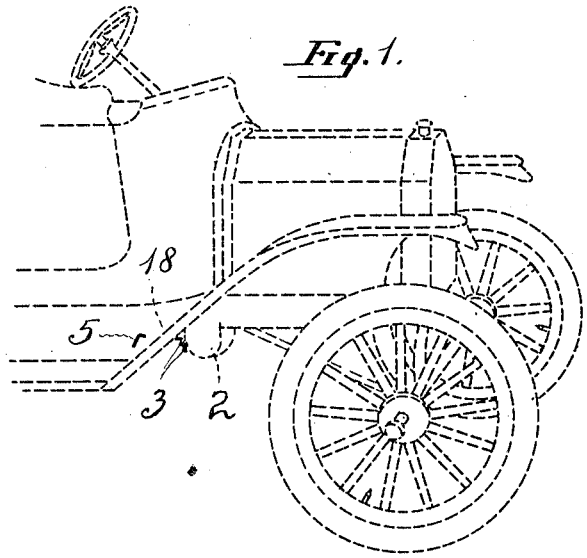
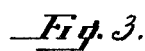
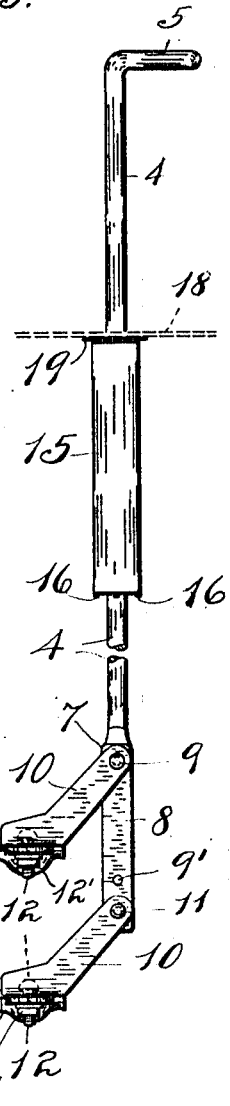
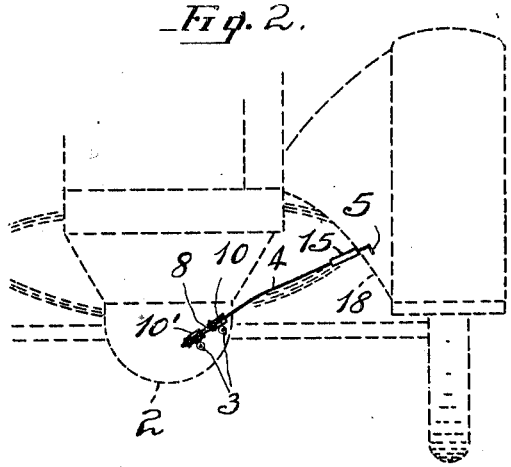
WITNESS:
John C. Ballentine
INVENTOR:
Walter R. Seldon,
By H. M. Richards.
atty.

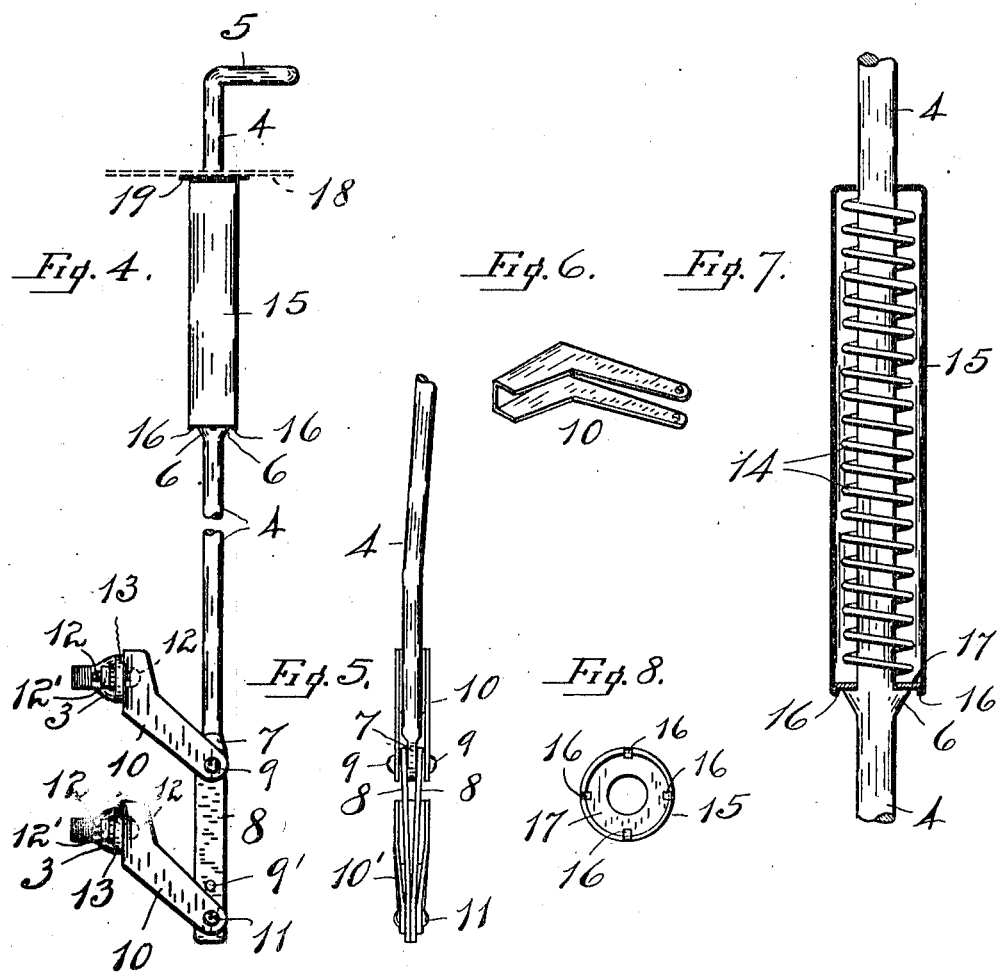

UNITED STATES PATENT OFFICE.

WALTER R. SELDON, OF MONMOUTH, ILLINOIS.

PETCOCK OPENER AND CLOSER FOR AUTOMOBILE CRANK-CASES.

1,184,883. Specification of Letters Patent. Patented May 30, 1916.

Application filed October 22, 1915. Serial No. 57,385.

*To all whom it may concern:*

Be it known that I, WALTER R. SELDON, a citizen of the United States, and a resident of Monmouth, in the county of Warren and State of Illinois, have invented a new and useful Petcock Opener and Closer for Automobile Crank-Cases, of which the following is a specification.

My invention relates to a device whereby the pet-cocks of automobile crank-cases may be manually opened without effort, and without either reaching or getting under the car, and which will automatically close them when the manual operation ceases; and the invention consists, substantially, in the improvements herein described.

In the accompanying drawings, which illustrate a practical and preferred embodiment of my invention: Figure 1 is a side elevation showing the front portion of an automobile with my improvement attached thereto and illustrating the convenient and accessible position in which it is placed. Fig. 2, a rear elevation, showing the attachment of the device to the pet-cocks of the crank-case. Fig. 3, an elevation of the improvement attached to the pet-cocks showing it as it appears when the valves are opened. Fig. 4, a similar view, the device in normal position and the valves closed. Fig. 5, an edge view of the inner end portion of the device, no pet-cocks being shown. Fig. 6, a detail perspective of one of the levers. Fig. 7, an enlarged central sectional detail, partly in elevation; and Fig. 8, an end detail of the spring-case and washer.

Referring to each element and part thereof by a distinguishing numeral, uniformly employed, and considering said drawings, 2 indicates the crank-case of an automobile, and 3, 3 the pet-cocks or valves thereof.

4 designates an actuating rod having a handle 5, an annular shoulder 6 and a flattened end 7.

8 indicates a V-shaped or split link (shown best in Fig. 5), united at its split end to the end 7 of the rod 4 by a pivot pin 9 and provided with a plurality of apertures 9' whereby adjustment of one of the levers (now to be described) may be effected.

10, 10' indicate bifurcated bell-crank levers, the split end of the former straddling the split end of the link 8 and pivoted thereto and to the rod end 7 by the pin 9. The split end of the lever 10' strides the outer end portion of the link and is pivoted thereto by a pin 11. The fold of each of the levers is apertured for the reception of the stem of a stove-bolt 12 which passes also through the head 13 of the valve-stem of a pet-cock 3.

14 designates an expansion coil spring embracing the rod 4 and held within a tubular spring-casing 15 slidably mounted on said rod. Struck inward from the lower edge of the tube are lips 16 on which is supported a washer 17 which seats also on the shoulder 6.

18 designates a fender and may be assumed to indicate any other suitable part of an automobile.

19 designates a leather or other soft washer seated on the rod 4 and having placement intermediate the casing 15 and fender 18, and is purposed primarily to prevent noises caused by the rattling of the casing 15, caused by the vibrations of the vehicle when it is in motion.

The operation: As hereinbefore stated, the normal position of the device is shown in Fig. 4. Assume, then, that the parts of the device to be in the relative positions there shown, and that it is desirable to open the pet cocks, in order to ascertain how much oil is in the crank-case, or for any other purpose, the operator will, by means of the handle 5 draw on the rod 4, thereby shifting all the elements to the position shown in Fig. 3 or, of course to any intermediate one desired. This movement compresses the spring 14, for the head of the casing 15 abuts against the fender 18 and the shoulder 6 will draw the movable washer 17 upward, and the spring will be compressed against the head of the casing. It will be understood, of course, that the spring-case is not rigidly, but, on the contrary, is somewhat loosely fixed to the fender, and that it and the rod 4 will yield sufficiently laterally to permit the link 8 and the levers 10, 10' to operate. Upon release of the handle 5 the energy thus stored in the spring will be exerted and the spring will react to force the washer 17 against the shoulder 6 and return the parts to their normal positions, thus closing the valves in the pet-cocks.

It will be manifest that under no circumstances, such as by one of the pet-cocks being struck and thus opened, or by forgetting to close them or either of them, can a loss of oil result, for the spring holds them constantly closed. Also it will be evident that they may be opened without the slightest inconvenience to the operator and without soiling his garments.

It has not been thought necessary to encumber this specification and the accompanying drawings with descriptions and illustrations of modifications or of elements which are neither essential to nor form any part of the invention herein claimed. In fact, it is apparent without such that numerous changes may be made in the details of construction and by modifications involving only mechanical skill, without departing from the spirit and scope of the invention.

Therefore, without limiting myself to particularities I claim as new and desire to secure by Letters Patent the following, to-wit:

1. A device of the character described comprising a push-rod, a spring for moving it in one direction, a bifurcated link straddling one end of said rod and pivoted thereto, and a pair of bell-crank levers each of which has a bifurcated end pivoted to said link.

2. A device of the character described comprising a push-rod, a spring for moving it in one direction, a bifurcated link straddling one end of said rod and pivoted thereto, and a pair of levers each of which has a bifurcated end pivoted to said link.

3. In an automobile, the combination with the pet-cocks of the crank-case and with one of the fenders, of yielding means attached to said fender and adapted to hold both pet-cocks normally closed, and means for simultaneously opening both pet-cocks.

4. A device of the character described comprising a spring-case, a spring coiled longitudinally thereof and therein, one of its ends restrained by a portion of the spring-case, a washer reciprocable in the spring-case, its movement in one direction limited by a portion of said case, a push-rod having a shoulder adapted to move said washer in said case to thereby compress the spring, a bifurcated link straddling one end of said rod and pivoted thereto, and a pair of levers each of which has a bifurcated end pivoted to said link.

5. A device of the character described comprising a spring-case, a push-rod movable therein, a spring in said case and adapted to move said rod in one direction, a bifurcated link pivoted to one end of said rod, and a pair of levers each of which has a bifurcated end pivoted to said link.

6. A device of the character described comprising a spring-case, a push-rod movable therein, a spring arranged in said case and adapted to move said rod in one direction, a bifurcated link straddling one end of said rod and pivoted thereto, and a pair of bell-crank levers each of which has a bifurcated end pivoted to said link.

In testimony that I claim the foregoing as my own, I hereunto affix my signature.

WALTER R. SELDON.